No. 769,691. PATENTED SEPT. 13, 1904.
W. S. DAVENPORT.
DARK ROOM LANTERN.
APPLICATION FILED JULY 13, 1903.
NO MODEL. 3 SHEETS—SHEET 1.

Witnesses:
Louis W. Gratz
Robert Weitknecht

W. S. Davenport
Inventor
By Geyer & Popp
Attorneys.

No. 769,691. PATENTED SEPT. 13, 1904.
W. S. DAVENPORT.
DARK ROOM LANTERN.
APPLICATION FILED JULY 13, 1903.
NO MODEL. 3 SHEETS—SHEET 2.

Witnesses:
Louis W. Gratz.
Robert Weitknecht

W. S. Davenport Inventor
By Geyer & Popp
Attorneys

No. 769,691. PATENTED SEPT. 13, 1904.
W. S. DAVENPORT.
DARK ROOM LANTERN.
APPLICATION FILED JULY 13, 1903.
NO MODEL. 3 SHEETS—SHEET 3.
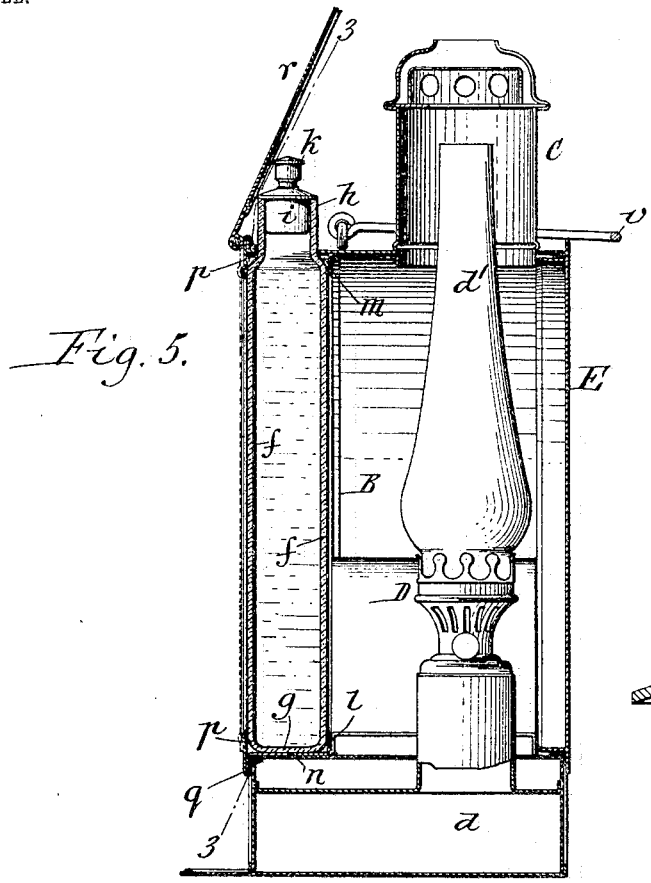
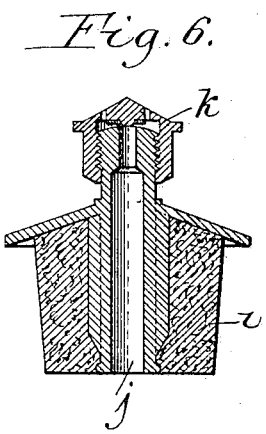
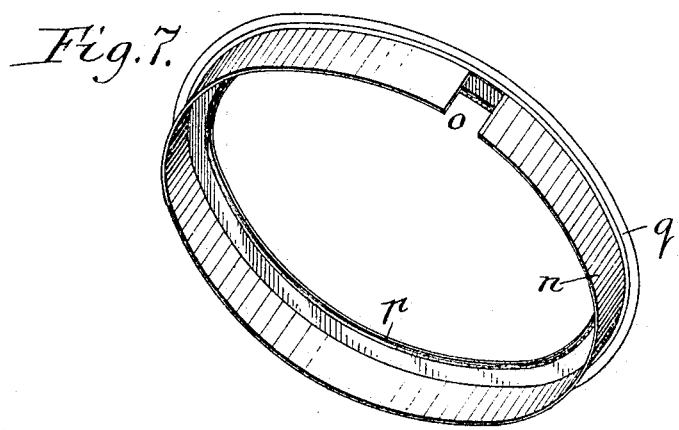
Witnesses:
Louis W. Gratz.
Robert Weitknecht.
W. S. Davenport, Inventor
By Geyer & Popp
Attorneys No. 769,691. Patented September 13, 1904.

UNITED STATES PATENT OFFICE.

WILLIAM S. DAVENPORT, OF DRESDEN, GERMANY.

DARK-ROOM LANTERN.

SPECIFICATION forming part of Letters Patent No. 769,691, dated September 13, 1904.

Application filed July 13, 1903. Serial No. 165,247. (No model.)

*To all whom it may concern:*

Be it known that I, WILLIAM S. DAVENPORT, a citizen of the United States, residing at Dresden, Germany, have invented new and useful Improvements in Dark-Room Lanterns, of which the following is a specification.

This invention relates to a lantern for illuminating photographic dark rooms.

In one form of dark-room lanterns as heretofore constructed the objectionable rays of light of the lamp-burner were filtered or intercepted by means of suitably-colored plates or fabrics, which are objectionable for the reason that these media cut off about ninety-eight per cent. of the general illumination of the source of light. Ray-filters for this purpose have also been constructed in the form of glass vessels containing a colored solution, which vessels were either open at the top or closed by means of glass covers cemented thereto. While this kind of ray-filter permits of obtaining nearly fifty per cent. of the total illumination without danger of fogging the gelatin dry-plates, it is nevertheless found undesirable for the reason that if the vessel is left open at the top the liquid is liable to spill out of the same in handling the lantern, and if a cover is cemented thereto the constant expansion and contraction of the liquid solution, together with the chemical action thereof, either causes the joint between the vessel and cover to become leaky or causes the vessel to burst, due to the pressure produced by variation in temperature.

The principal object of this invention is the production of a lantern of this character in which the vessel containing the filtering solution is so constructed as to yield the maximum lighting efficiency without liability of spilling the solution or bursting the vessel.

My invention has the further object to provide simple means whereby the ray-filter may be readily and conveniently attached to the lantern-frame or removed therefrom.

Figure 1:
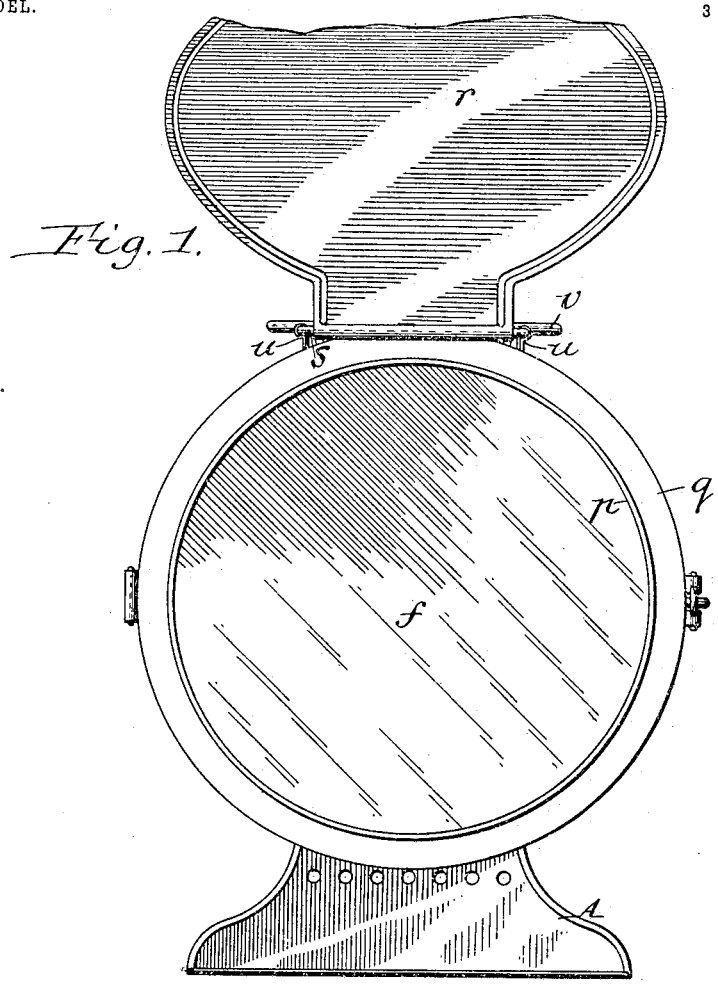
Figure 2:
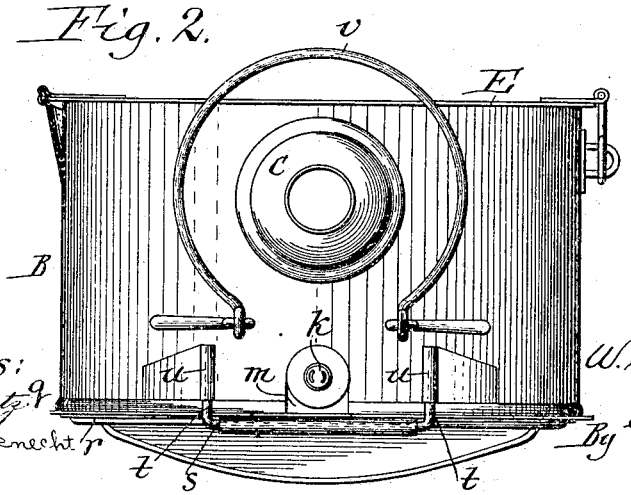
Figure 3:
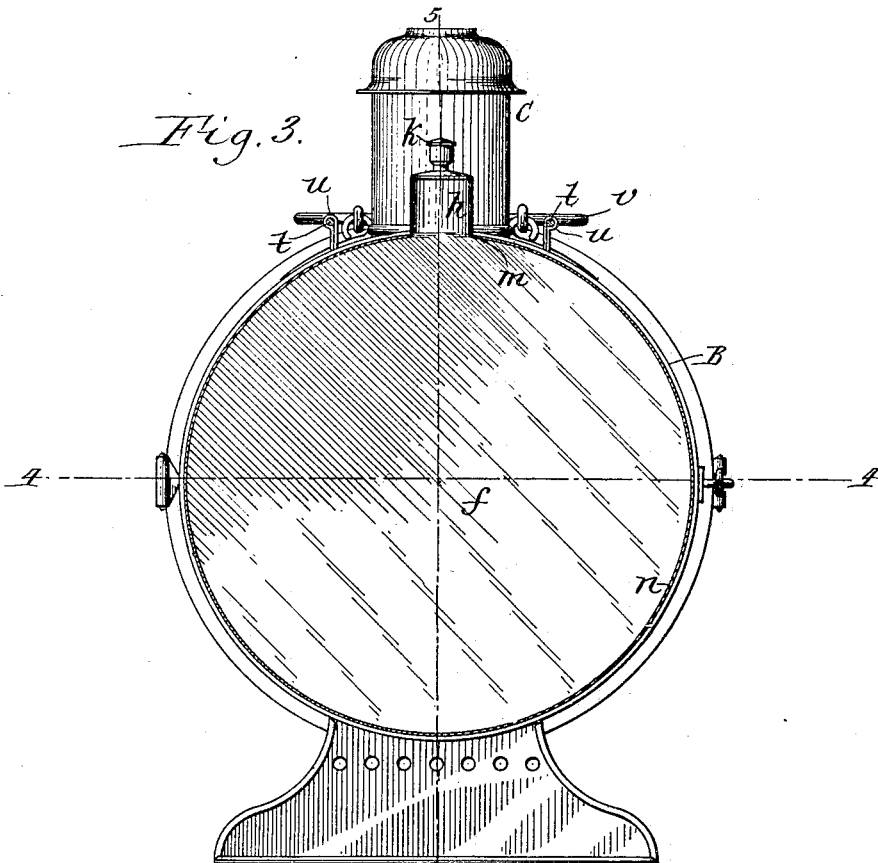
Figure 4:
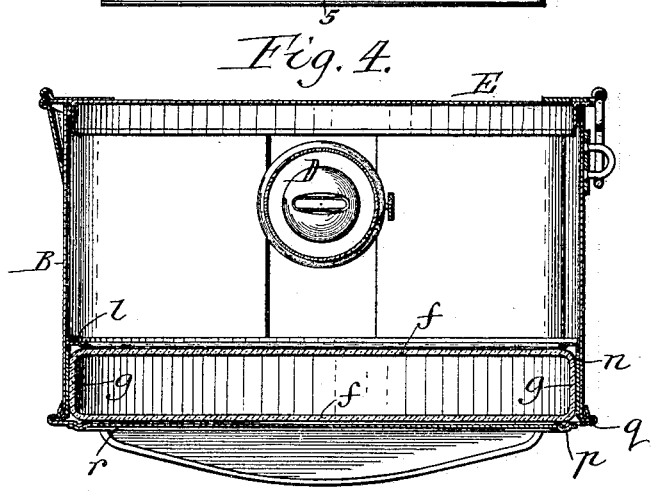

In the accompanying drawings, consisting of three sheets, Figure 1 is a front elevation of a dark-room lantern embodying my improvements. Fig. 2 is a top plan view of the same. Fig. 3 is a vertical section of the lantern, taken in line 3 3, Fig. 5. Fig. 4 is a horizontal section in line 4 4, Fig. 3. Fig. 5 is a vertical transverse section at right angles to Fig. 3, taken in line 5 5 of said figure. Fig. 6 is an enlarged sectional elevation of the inclosure for the neck of the vessel containing the filtering solution. Fig. 7 is a perspective view of the retaining device whereby the ray-filter is held in place in the main casing.

Similar letters of reference indicate corresponding parts throughout the several views.

A represents the base of the lantern, B the casing mounted on the base, and C the dome arranged above the casing. The latter is preferably of cylindrical form and arranged horizontally with its axis. Within the casing is arranged a suitable light-generator, such as a burner D, which is supplied with oil from a pot or reservoir $d$ in the base and has its chimney $d'$ extending upwardly into the dome, as shown in Fig. 5. The rear side of the casing is provided with a door or cover E, which is movable to afford access to the burner for cleaning and adjusting the same and for filling the pot with oil.

In the front end of the casing is arranged the ray-filter, which permits the harmless rays of light from the burner to pass out and illuminate the space externally of the lantern, but which intercepts the rays which have a harmful effect on the sensitized plates. This filter is constructed integrally of glass or other transparent material and consists, essentially, of a vessel or flask having a reduced opening whereby the same may be filled with a colored or other suitable liquid solution having the capacity of intercepting actinic rays. This vessel consists of two parallel disks or flat circular sides $f\,f$, which are separated by an intervening space, a cylindrical rim $g$, connecting the periphery of the sides, and a tubular neck $h$, projecting upwardly from the rim, all of which parts are formed in one piece. The neck of the filter vessel may be provided with a closure of any suitable kind. The preferred form of closure shown in the drawings consists of a cork $i$, fitting into the neck and provided with a vent tube or nipple $j$, which can be opened or closed by a screw-cap $k$ applied to the outer end thereof.

In the use of the lantern the cap $k$ is unscrewed sufficiently to open the vent-tube, so as to permit the liquid in the vessel to expand, owing to the heat of the burner, and to contract upon cooling when the burner is extinguished. If the neck were closed while the lamp is burning, the expansion of the contents of the vessel would burst the same, and a like result would be produced by the cooling of the contents if the neck of the flask were closed immediately after the burner is extinguished.

Inasmuch as the body of the filter is made of one piece the danger of leakage, which is liable to occur in a filter having its vessel made of separate pieces connected by cement, is wholly avoided. Owing to the small opening in the neck when the lamp is in use the same may be carried about with considerable freedom without spilling any of the liquid contents of the filter, and, furthermore, the evaporation of the liquid is reduced to a minimum. When the lantern is handled while it is extinguished and cooled off, it is preferable to close the cap of the vessel in order to effectually guard against accidental discharge of the liquid and undue evaporation.

The vessel of the filter is of slightly smaller diameter than the casing of the lantern. The latter is provided with an internal flange or shoulder $l$, with which the inner side of the vessel engages at its periphery. On its upper side the lantern-casing is provided with a notch or recess $m$, extending backwardly from its front edge and constructed to receive the neck of the filter vessel, which normally projects above the lantern, as shown in Figs. 2, 3, and 5.

For the purpose of detachably securing the filter in the lantern-body a frictional retaining device is provided which consists, essentially, of a cylindrical band $n$, having a notch or recess $o$ in its rear edge and internal and external annular flanges $p$ $q$ arranged at its outer edge. This band is shoved with its inner edge between the periphery of the vessel and the casing, so that its notched part receives the neck of the vessel, and its external and internal flanges bear against the outer side of the vessel and the casing, respectively, as shown in Figs. 4 and 5. This means of fastening the vessel in place is very simple and efficient and permits the flask to be readily removed from the casing and replaced when it is desired to change the solution in the vessel or for other purposes.

Pivotally connected with the top of the lantern-body near its front end is a shutter screen or cover $r$, which can be swung either into an upwardly-projecting position, as shown in Figs. 1 and 5, for exposing the light of the lantern, or the same may be swung downwardly over the front of the lantern for shutting off the light or protecting the filter against injury. The screen is preferably made removable by hinging the same to a pintle $s$, provided at its ends with rearwardly-projecting arms or rods $t$, which slide in loops $u$ on the top of the casing.

For convenience in carrying the lantern about the same may be provided with a hinged handle or bail $v$ on top of its casing, as shown in Figs. 2, 3, and 5.

I claim as my invention—

1. In a dark-room lantern, the combination of the casing provided with an internal seat and a shoulder at the inner end of said seat, a liquid ray-filter supported at its edge in said seat and bearing on its inner side against said shoulder, and a retaining-band arranged between the edge of said filter and the seat of the casing, substantially as set forth.

2. In a dark-room lantern, the combination of the casing provided with an internal seat and a shoulder at the inner end of said seat, a liquid ray-filter supported at its edge in said seat and bearing on its inner side against said shoulder, and a retaining-band arranged between the edge of the filter and the seat of the casing and provided with an internal flange which bears against the marginal part of the outer side of said filter, substantially as set forth.

3. In a dark-room lantern, the combination of a casing provided with a notch in the upper part of its front edge, and a liquid ray-filter comprising a vessel arranged in the casing and having a contracted filling-neck at its top which is seated in said notch, substantially as set forth.

4. In a dark-room lantern, the combination of a casing provided with a notch in the upper part of its front edge, a vessel for a ray-filtering liquid arranged in the casing and having a contracted filling-neck at its top which is arranged in said notch, and a retaining-band fitting between said vessel and casing and having a recess which receives said neck, substantially as set forth.

5. In a dark-room lantern, the combination of a casing provided with a notch in the upper part of its front edge, a vessel for a ray-filtering liquid arranged in the casing and having a contracted filling-neck at its top which is arranged in said notch, and a retaining-band fitting between said vessel and casing and having a recess which receives said neck and a flange engaging the outer side of the vessel, substantially as set forth.

6. In a dark-room lantern, the combination of a casing having an internal shoulder and a notch in the top of its front edge, a vessel for a ray-filtering liquid bearing at its inner side against said shoulder and having a contracted filling-neck at its top which is arranged in said notch, and a retaining device comprising a band arranged between the casing and vessel and having a recess which receives said neck, and internal and external flanges which engage with the outer side of the vessel and casing, substantially as set forth.

7. A dark-room lantern comprising a casing, a ray-filter arranged in the front part of the casing, a pair of horizontal loops arranged parallel and lengthwise on top of the casing, a hinge member composed of a horizontal pintle and two arms or rods projecting rearwardly from opposite ends of the pintle and seated in said loops, and a shutter or screen pivoted on said pintle and arranged to be swung toward and from the front side of said filter, substantially as set forth.

Witness my hand this 4th day of June, 1903.

WILLIAM S. DAVENPORT.

Witnesses:
PAUL E. SCHILLING,
PAUL ARRAS.